United States Patent
Keck et al.

[11] 3,904,268
[45] Sept. 9, 1975

[54] OPTICAL WAVEGUIDE HAVING OPTIMAL INDEX GRADIENT

[75] Inventors: Donald B. Keck, Big Flats; Robert Olshansky, Painted Post, both of N.Y.

[73] Assignee: Corning Glass Works, Corning, N.Y.

[22] Filed: Nov. 15, 1974

[21] Appl. No.: 524,074

[52] U.S. Cl. .................. 350/96 WG; 350/175 GN
[51] Int. Cl.² ............................................ G02B 5/14
[58] Field of Search ............... 350/96 WG, 175 GN

[56] References Cited
UNITED STATES PATENTS
3,823,997  7/1974  Gloge et al. .................. 350/96 WG

*Primary Examiner*—R. V. Rolinec
*Assistant Examiner*—Darwin R. Hostetter
*Attorney, Agent, or Firm*—William J. Simmons, Jr.; Walter S. Zebrowski; Clarence R. Patty, Jr.

[57] ABSTRACT

A graded-index optical waveguide for use in an optical communication system in which optical signals having a mean wavelength $\lambda$ are propagated. The fiber comprises a core of radius $a$ surrounded by a suitable cladding layer, the refractive index $n(r)$ at any radius $r$ less than $a$ being given by $$n(r) = n_1[1 - 2\Delta(r/a)^\alpha]^{1/2}$$

where $$\alpha = 2 + y - \frac{\Delta(4+y)(3+y)}{(5+2y)}$$

$$y = -\frac{2n_1}{N_1} \frac{\lambda d\Delta/d\lambda}{\Delta}$$

$n_1$ is the refractive index at the center of the core, $n_2$ is the refractive index of the core at $r = a$, $\Delta = (n_1^2 - n_2^2)/2n_1^2$ and $N_1 = n_1 - \lambda\, dn_1/d\lambda$. This index gradient takes into account effects introduced by differences between the dispersive properties of the core and cladding compositions and thus provides minimum delay distortion at the wavelength of the propagated light.

6 Claims, 4 Drawing Figures

OPTICAL WAVEGUIDE HAVING OPTIMAL INDEX GRADIENT

BACKGROUND OF THE INVENTION

This invention relates to optical communication systems, and more particularly, to systems employing optical waveguides having optimal refractive index gradients.

Recent advances in the fabrication of optical fibers from ultratransparent materials have caused such fibers to be a promising transmission medium for optical communication systems. These light transmitting fibers, which are referred to as optical waveguides generally consist of a transparent core surrounded by a layer of transparent cladding material having a refractive index which is lower than that of the core.

The propagation of light waves in optical waveguides is governed by laws of physics similar to those that govern microwave propagation and therefore can be studied in terms of modes, each of which has its own propagation and electromagnetic field characteristics. Single mode waveguides are advantageous in that they are capable of propagating optical signals with very low dispersion, but due to the low numerical aperture and/or small core size of such fibers, it is difficult to efficiently inject optical signals into these waveguides. Multimode waveguides have larger core diameters and/or larger numerical apertures than single mode waveguides. Multimode waveguides are therefore often the preferred medium for the transmission of optical signals since they can accept light from incoherent, broad spectral width sources such as light emitting diodes. However, thousands of modes propagate in multimode optical waveguides, each mode traveling at a slightly different group velocity. A short input pulse that is shared by many guided modes thus splits up into a sequence of pulses that arrive at the output end of the waveguide at different times. This type of pulse dispersion is the dominant cause of dispersion in typical multimode optical waveguides.

Optical waveguides initially consisted of a core of uniform refractive index surrounded by a layer of cladding material having a lower refractive index. In this type of prior art fiber the time required for the various modes to travel a given longitudinal distance along the waveguide increases as the mode order increases. The delay distortion in such a fiber, defined as the difference in the times it takes the fastest mode and the slowest mode to traverse a given longitudinal length, is very large. It has been recently recognized that optical waveguides, the cores of which have radially graded index profiles, exhibit significantly reduced pulse dispersion resulting from group velocity differences among modes. This dispersion reducing effect, which is discussed in the publication by D. Gloge et al., entitled "Multimode Theory of Graded-Core Fibers," published in the November 1973 issue of the Bell System Technical Journal, pp. 1563–1578, employs a radially graded, continuous index profile from a maximum value on-axis to a lower value at the core-cladding interface. The index distribution in this type of waveguide is given by the equation $$n(r) = n_1[1 - 2\Delta(r/a)^\alpha]^{1/2} \text{ for } r \leq a \quad (1)$$

where $n_1$ is the on-axis refractive index, $n_2$ is the refractive index of the fiber core at radius $a$, $\Delta = (n_1^2 - n_2^2)/2n_1^2$ and $a$ is the core radius.

It was initially thought that the parabolic profile wherein $\alpha$ is equal to 2 would provide an index gradient that would minimize dispersion caused by group velocity differences among the modes. Parabolic graded-index optical waveguide fibers and methods of producing the same are taught in U.S. Pat. No. 3,823,995 issued to L. L. Carpenter on July 16, 1974, U.S. Pat. No. 3,826,560 issued to P. C. Schultz on July 30, 1974, U.S. Pat. No. 3,801,181 issued to Kitano et al. on Apr. 2, 1974, U.S. Pat. No. 3,817,731 issued to Yoshiyagawa on June 18, 1974, U.S. Pat. No. 3,791,806 issued to Koizumo et al. on Feb. 12, 1974 and U.S. Pat. No. 3,822,121 issued to Koizumo et al. on July 2, 1974. Some techniques for measuring refractive index profiles of optical waveguides are disclosed in the publications: "Viewing Refractive-Index Profiles and Small-Scale Inhomogeneities in Glass Optical Fibers: Some Techniques" by C. A. Burrus et al., Applied Optics, Oct. 1974, Vol 13, No. 10, pp. 2365–2369 and "Refractive Index Profile Measurements of Diffused Optical Waveguides" by W. E. Martin, Applied Optics, September, 1974, Vol. 13, No. 9, pp. 2112–2116 and in paper No. 3.5 entitled "Interferometric Measurement of SELFOC Dielectric Constant Coefficients to Sixth Order" by E. G. Rawson et al., 1973 IEEE/OSA Conference on Laser Engineering and Applications, May 30–June 1, 1973, a brief description of which may be found on pp. 22–23 of the *Digest of Technical Papers* presented at said conference.

The aforementioned Gloge et al. publication describes a further development wherein a reduction in pulse dispersion is said to be obtained if, instead of $\alpha$ being equal to 2, it is equal to $2 - 2\Delta$. However, the theory concerning index gradients wherein $\alpha$ is equal to 2 or $2 - 2\Delta$ neglects effects introduced by differences between the dispersive properties of the core and cladding compositions.

SUMMARY OF THE INVENTION

It is therefore an object of the present invention to increase the information carrying capacity of an optical communication system by employing a graded index optical waveguide having an optimal index gradient for reducing dispersion.

Briefly, the present invention relates to an optical communication system comprising a light source having a mean wavelength $\alpha$, a multimode optical waveguide having its input end connected to the light source and its output end connected to light detecting means. The waveguide is characterized in it comprises a transparent core having a radius $a$ and an on-axis refractive index $n_1$. The core is surrounded by a layer of cladding material having a refractive index that is lower than $n_1$. The refractive index $n(r)$ of the core varies as a function of the radial distance $r$ from the center of the core substantially as $$n(r) = n_1[1 - 2\Delta(r/a)^\alpha]^{1/2} \text{ for } r \leq a$$

where $\alpha$ lies outside the range from 2 to $(2 - 2\Delta)$ and is determined by the equation $$\alpha = 2 + y - \frac{\Delta(4+y)(3+y)}{(5+2y)}$$

where $$y = \frac{-2n_1}{N_1} \frac{\lambda d\Delta/d\lambda}{\Delta}$$

$$\Delta = (n_1^2 - n_2^2)/2n_1^2$$

$$N_1 = n_1 - \lambda dn_1/d\lambda$$

and $n_2$ is the refractive index of the core at $r = a$.

DETAILED DESCRIPTION

Figure 2:
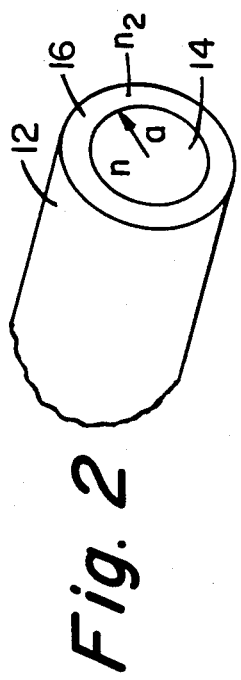
FIG. 2 shows a segment of the waveguide employed in FIG. 1.
Figure 1:
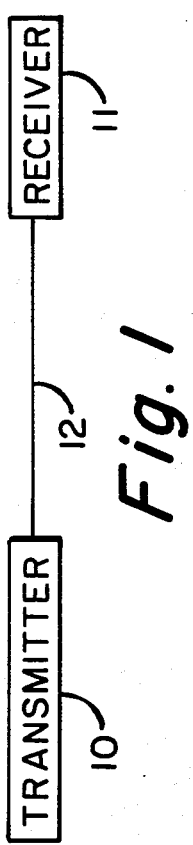
FIG. 1 shows, in block diagram form, an optical communication system.

FIG. 1 shows in block diagram form an optical communication system comprising a transmitter 10, a receiver 11 and an optical waveguide fiber 12 connecting the transmitter to the receiver. Obviously, means for transmitting and means for receiving could be located at each end of waveguide 12. In FIG. 2, waveguide 12 is illustrated as comprising a cylindrical core 14 of refractive index $n$ and radius $a$ surrounded by a layer 16 of cladding material of refractive index $n_2$ that is lower than that of the core. In accordance with the present invention the core of waveguide 12 has a graded-type refractive index distribution wherein the refractive index $n$ varies in accordance with equation 1 and wherein $\alpha$ is dependent upon the core and cladding materials and the wavelength of the optical signals propagating in the waveguide. The recognition of the importance of the core and cladding material effects has resulted in this new optimal gradient whereby the waveguide exhibits dispersion that is usually much lower than that which can be achieved with waveguides having a parabolic ($\alpha = 2$) or a near parabolic ($\alpha = 2 - 2\Delta$) index gradient. In the derivation of the graded-index waveguide wherein $\alpha$ is equal to $2 - 2\Delta$, the WKB approximation was employed in the aforementioned Gloge et al. publication to find the axial propagation constants $\beta_m$ of the modes of such waveguides. From equations 10 and 12 of the Gloge et al. publication the propagation constants $\beta_m$ for mode $m$ can be written as follows:

$$\beta_m = n_1 k [1 - 2\Delta (m/M)^{\alpha/(\alpha+2)}]^{1/2} \tag{2}$$

wherein $M$ is the total number of propagating modes and is given by $$M = \frac{\alpha}{\alpha+2} n_1^2 k^2 a^2 \Delta \tag{3}$$

where $k$ is the free space propagation constant and is defined by $k = 2\pi/\lambda$ where $\lambda$ is the free space wavelength.

The delay time per unit length of mode $m$ is defined by $$\tau_m = \frac{1}{c} \frac{d\beta_m}{dk} \tag{4}$$

From equations 2 through 4 the following equation can be derived:

$$\tau_m = \frac{N_1}{c} \left[ 1 + C_1 \Delta \left(\frac{m}{M}\right)^{\alpha/(\alpha+2)} + C_2 \Delta^2 \left(\frac{m}{M}\right)^{2\alpha/(\alpha+2)} + O(\Delta^3) \right] \tag{5}$$

where $$N_1 = n_1 - \lambda \, dn_1/d\lambda \tag{6}$$

$$C_1 = \left( \alpha - 2 + \frac{2n_1}{N_1} \frac{\lambda d\Delta/d\lambda}{\Delta} \right) \frac{1}{\alpha+2} \tag{7}$$

and $$C_2 = \left( \frac{3\alpha-2}{2} + \frac{2n_1}{N_1} \frac{\lambda d\Delta/d\lambda}{\Delta} \right) \frac{1}{\alpha+2} \tag{8}$$

It is known that there is no index profile that can completely equalize the group velocities of all modes propagating in the fiber, and therefore, the delay time $\tau_m$ of equation 5 cannot have the same value for all of the propagating modes. However, since the index difference is small, i.e., $\Delta$ is very much less than 1 in optical waveguides suitable for telecommunication, the delay differences among the modes, and hence the pulse dispersion, can be significantly reduced if $C_1$ can be made equal to or nearly equal to zero. From equation 7 it can be seen that this can be achieved by constructing the waveguide with an index gradient such that $\alpha$ is approximately defined as $$\alpha \cong 2 - \frac{2n_1}{N_1} \left( \frac{\lambda d\Delta/d\lambda}{\Delta} \right) \tag{9}$$

Previous attempts to formulate an optimal value of $\alpha$ have neglected the effects introduced by differences between the dispersive properties of the core and cladding compositions and have therefore failed to include the right hand term appearing in equation 9. This new term indicates that the differences in the dispersive properties of core and cladding glass compositions leads to a correction to the parabolic index gradient wherein $\alpha$ is equal to 2. As will be indicated subsequently, the additional term in equation 9 leads to corrections to the optimal value of $\alpha$ on the order of 5–25 percent relative to the parabolic gradient for two titania doped optical waveguides. Reduced pulse dispersion can be obtained in optical waveguides made from any materials when they are designed in accordance with the present invention.

In the publication "Receiver Design for Digital Fiber Optic Communication System" by S. D. Personick, Bell System Technical Journal, Vol. 56, No. 6, p. 843 (1973), it has been shown that the rms pulse width is a useful quantity for characterizing the information carrying capacity of an optical waveguide. Accordingly, the influence of the index gradient $\alpha$ on pulse dispersion in multimode waveguides can be illustrated by using the delay time defined by equations 5 through 8 to calculate the rms pulse width defined as $$\sigma = \left[ \langle \tau_m^2 \rangle - \langle \tau_m \rangle^2 \right]^{1/2} \qquad (10)$$

The brackets $\langle \ \rangle$ in equation 10 indicate an average over all of the guided modes. Assuming that all modes are equally excited, it is found that $$\sigma = \frac{N_1 \Delta}{c} \ \frac{\alpha}{2\alpha+2} \left(\frac{\alpha+2}{3\alpha+2}\right)^{1/2} \left( C_1^2 + 4C_1 C_2 \ \frac{\Delta(\alpha+1)}{(2\alpha+1)} + \frac{4C_2^2 \Delta^2 (2\alpha+2)^2}{(5\alpha+2)(3\alpha+2)} \right)^{1/2} \qquad (11)$$

The rms pulse width $\sigma$ exhibits a deep, narrow minimum which occurs at $$\alpha = 2 + y - \Delta \ \frac{(4+y)(3+y)}{(5+2y)} \qquad (12)$$

where $$y = \frac{-2n_1}{N_1} \ \frac{\lambda d\Delta/d\lambda}{\Delta} \qquad (13)$$

Equations 12 and 13 differ from equation 9 by the presence of a small correction factor to the optimal $\alpha$ value which is of order $\Delta$.

The additional term in equation 12 as compared with equation 9 causes equation 12 to more precisely define the optimal value of $\alpha$. Therefore, equation 12 along with equation 13 define the optimal value of $\alpha$ in accordance with the present invention.

The cladding layer can be any one of the several described in U.S. Pat. No. 3,785,718 issued to D. C. Gloge on Jan. 15, 1974 including a lossy jacket; a low-loss jacket of refractive index $n_2$; a low-loss jacket having a refractive index intermediate $n_1$ and $n_2$; or a low-loss intermediate jacket of prescribed thickness whose refractive index is less than $n_1$ surrounded by a lossy outer jacket. The relationships among the various parameters of the above-described claddings are described more fully in the aforementioned Gloge patent which is incorporated herein by reference.

Figure 3:
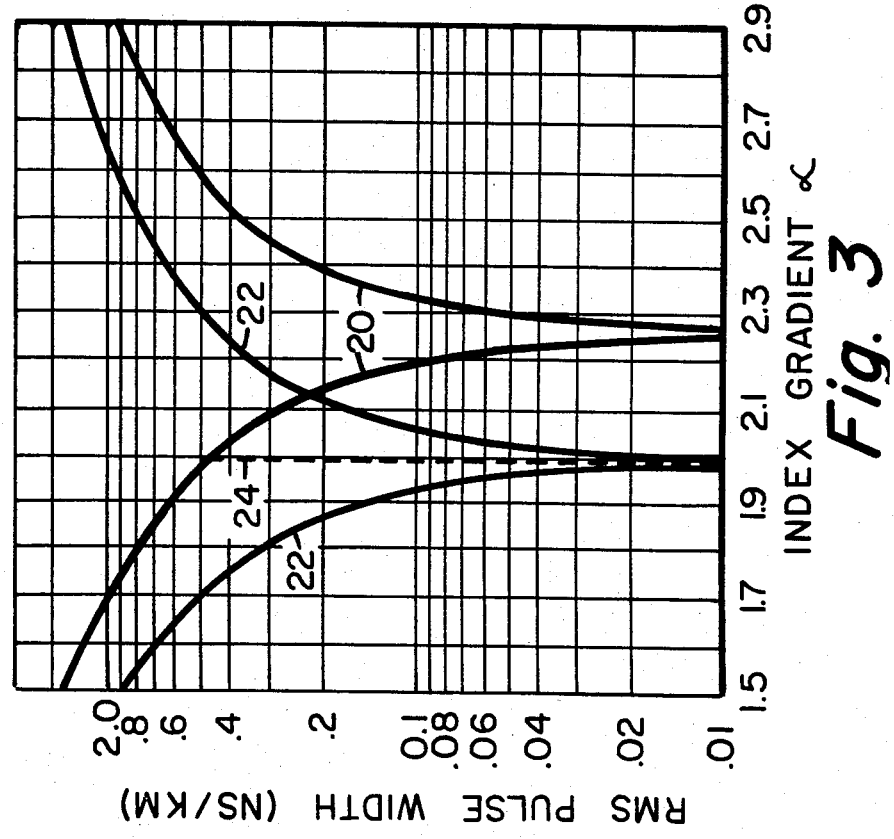
FIG. 3 is a graph wherein rms pulse width is plotted as a function of index gradient $\alpha$.

Values of $n_1$, $dn_1/d\lambda$, $n_2$ and $dn_2/d\lambda$, which are needed to evaluate these equations can be obtained by performing a Sellmeier fit to refractive index measurements taken at different wavelengths for glass compositions used as core and cladding materials. As an example, consider a multimode optical fiber consisting of a fused silica core doped at the center with 3.4 weight percent $TiO_2$ and a pure fused silica cladding. From the appropriate Sellmeier fits it can be found that at a wavelength $\lambda$ of 0.9$\mu$m, $n_1$ is equal to 1.46039, $n_2$ is equal to 1.45175, $\Delta$ is equal to 0.00589, $\lambda dn_1/d\lambda$ is equal to $-0.01413$ and $\lambda d\Delta/d\lambda$ is equal to $-0.00081$. Substituting these values into equations 12 and 13 gives a value of $\alpha$ equal to about 2.26 as the optimal gradient for this waveguide composition at an operating wavelength of 0.9$\mu$m. The influence of the correction for material dispersion is illustrated in FIG. 3 wherein the rms pulse width is plotted as a function of index gradient $\alpha$. This graph is based on equation 11 using values of $C_1$ and $C_2$ determined from the above index data for the waveguide, which consists of fused silica doped with 3.4 weight percent $TiO_2$ along the axis. As can be seen in FIG. 3 a deep minimum occurs in the set of curves 20 at an $\alpha$ value of 2.26.

After the optimal value of $\alpha$ is determined, the refractive index gradient of the core can be determined from equation 1. An optical waveguide satisfying equation 1 can then be formed in accordance with one of the methods disclosed in the aforementioned U.S. Pat. Nos. 3,823,995 and 3,826,560, for example. Regardless of the method of fabrication it is improbable that a graded index optical waveguide, wherein $\alpha$ is precisely equal to a predetermined value, can be formed. However, it is possible to fabricate waveguides wherein the index profile approximates the optimal profile defined by equation 12 and yet achieve a significant reduction in pulse width. For example, as discussed hereinabove, curve 20 of FIG. 3 indicates that an rms pulse width of less than 0.1 ns/km can be achieved for values of $\alpha$ in the range of 2.19–2.33 if the optimal value of $\alpha$ as determined by equation 12 is 2.26.

To emphasize the significance of the present invention, a second set of curves 22 is plotted in FIG. 3 in which the term $d\Delta/d\lambda$ of equation 13 has been set equal to zero, thereby causing the term $y$ in equation 12 to equal zero. This set of curves is for the same waveguide materials and the same wavelength as curves 20. Setting $y$ equal to zero in equation 12 erroneously causes the rms pulse width to reach a minimum at an $\alpha$ value of $2 - (12/5)\Delta$ which is represented by dashed line 24. The minimum $\alpha$ value indicated by curves 22 is slightly less than 2, a value which was previously thought to minimize pulse dispersion. As stated previously, the minimum $\alpha$ value represented by dashed line 24 results from ignoring effects introduced by differences between the dispersive properties of the core and cladding materials. A waveguide fabricated with an $\alpha$ value as indicated by line 24 will yield an rms pulse width of about 0.5 ns/km, which is determined by the intersection of curve 20 and line 24. It is thus seen that the rms pulse width of a waveguide having an $\alpha$ value slightly less than 2 is large compared with the rms pulse width that can be achieved with a waveguide having an optimal or near-optimal $\alpha$ value determined in accordance with this invention.

Figure 4:
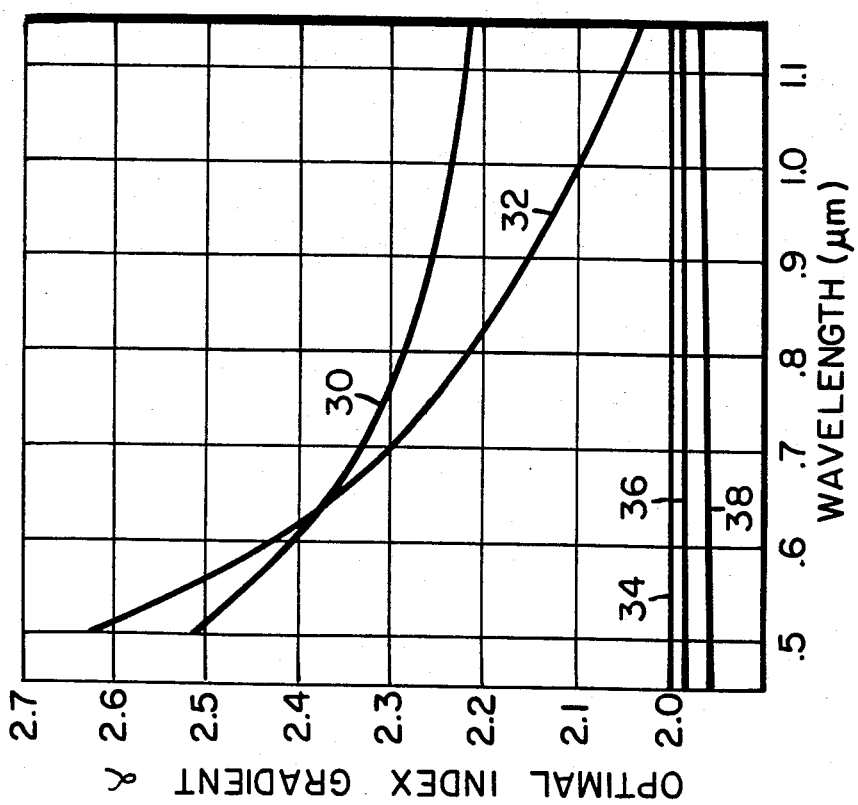
FIG. 4 is a graph wherein the optimal index gradient $\alpha$ is plotted as a function of wavelength.

The optimal $\alpha$ value and thus the deep minimum of curves 20 depends upon the core and cladding materials and the wavelength of the optical signals. This wavelength and material dependence of $\alpha$ is illustrated in FIG. 4 which is a graph of the optimal index gradient plotted as a function of wavelength. Curves 30 and 32 are for optical waveguides having pure fused silica cladding and an on-axis core composition of fused silica doped with 3.4 wt.% and 7.4 wt.% $TiO_2$, respectively. From the Sellmeier fits known for fused silica glass, for 3.4 wt.% $TiO_2$ doped silica glass and for 7.4 wt.% $TiO_2$ doped silica glass the optimal gradient $\alpha$ given by equations 12 and 13 has been determined for wavelengths between 0.5$\mu$m and 1.1$\mu$m since this region of the spectrum is presently of interest for optical communication systems. Line 34 is the $\alpha = 2$ line, and lines 36 and 38 are the $\alpha$ values obtained from the equation $\alpha = 2 - 2\Delta$ for waveguides having pure fused silica cladding and cores having an on-axis composition of fused silica doped with 3.4 wt.% and 7.4 wt.% $TiO_2$, respectively. It can be seen that the effect of material dispersion leads to a significant correction to the parabolic index profile wherein $\alpha$ is equal to 2 throughout the optical spectrum of interest and also to the near parabolic index profile wherein $\alpha$ is always slightly less than 2. Similar corrections should be needed for other compositions used in waveguide fabrication.

FIG. 4 further illustrates that the optimal index gradient can be as large as about 2.63 and as small as about 2.05 for the two titania doped waveguides, depending upon the wavelength. The slope of curve 32 is so great that it appears that it will intersect the $\alpha = 2$ line at about $1.3\mu m$. It thus appears that at some wavelengths the prior art $\alpha$ values of 2 and $2 - 2\Delta$ fortuitously minimize pulse broadening. Moreover, the $\alpha$ v. wavelength curve for some core and cladding materials may pass through the $\alpha = 2$ line within the wavelength spectrum of FIG. 4. However, since the $\alpha$ values that were previously considered to be optimal neglected effects due to the difference between the dispersive properties of the core and cladding materials, the prior art $\alpha$ values of 2 or $2 - 2\Delta$ could, at best, result in minimum pulse dispersion at some given wavelength for some given set of core and cladding materials. Thus, it is intended that the optimal $\alpha$ value in accordance with the present invention include only those values of $\alpha$ which lie outside the range from 2 to $2 - 2\Delta$ in those instances wherein the optimal $\alpha$ value as determined in accordance with the present invention falls within that prior art range.

We claim:
1. In an optical communication system comprising
   a light source having a mean wavelength $\lambda$,
   a multimode optical waveguide having input and output ends, said input end being disposed in light receiving relationship with respect to said source, and
   means responsive to light radiating from the output end of said waveguide,
   said optical waveguide being characterized in that it comprises
   a transparent core having a radius $a$ and an on-axis refractive index $n_1$, and
   a layer of cladding material surrounding said core, the refractive index of said layer being less than $n_1$, the refractive index $n(r)$ of said core varying as a function of the radial distance $r$ from the center of said core substantially as

$$n(r) = n_1[1 - 2\Delta(r/a)^\alpha]^{1/2} \text{ for } r \leq a$$

where $\alpha$ lies outside the range from 2 to $(2 - 2\Delta)$ and is determined by the equation $$\alpha = 2 + y - \frac{\Delta(4+y)(3+y)}{(5+2y)}$$

where $$y = -\frac{2n_1}{N_1} \frac{\lambda d\Delta/d\lambda}{\Delta}$$

$$\Delta = (n_1^2 - n_2^2)/2n_1^2$$
$$N_1 = n_1 - \lambda dn_1/d\lambda$$

and $n_2$ is the refractive index of said core at $r = a$.

2. An optical communication system in accordance with claim 1 wherein $\alpha$ is between about 2.05 and 2.6.

3. An optical communication system in accordance with claim 1 wherein said cladding layer is a low-loss material of refractive index $n_2$.

4. An optical communication system in accordance with claim 1 wherein said cladding layer is a lossy material.

5. An optical communication system in accordance with claim 1 wherein said cladding layer is a low-loss jacket having a refractive index intermediate $n_1$ and $n_2$.

6. An optical communication system in accordance with claim 1 wherein said cladding layer comprises an intermediate layer of low loss material surrounded by an outer layer of lossy material.

* * * * *